United States Patent
Jones et al.

[15] 3,673,164
[45] June 27, 1972

[54] 2-METHYLENE-3-BUTENYL QUATERNARY AMMONIUM MONOMERS AND POLYMERS

[72] Inventors: Giffin D. Jones; Gerald R. Geyer, both of Midland, Mich.; Melvin J. Hatch, Socorro, N. Mex.

[73] Assignee: The Dow Chemical Company, Midland, Mich.

[22] Filed: Sept. 3, 1970

[21] Appl. No.: 69,443

Related U.S. Application Data

[60] Continuation-in-part of Ser. No. 798,512, Oct. 23, 1968, Pat. No. 3,544,532, which is a division of Ser. No. 381,546, July 9, 1964, abandoned.

[52] U.S. Cl. ..........................260/80.3 N, 117/201, 162/138, 210/54, 260/86.1 N, 260/87.1 R, 260/87.5 R, 260/87.7 R, 260/88.1 PN
[51] Int. Cl. ....................C08f 3/84, C08f 15/02, C08f 15/24
[58] Field of Search ....................260/567.6 M, 80.3, 89.7 N, 260/86.1 N, 88.1 PN

[56] References Cited

UNITED STATES PATENTS 3,113,969 12/1963 Welton ..............................260/567.6
3,544,532 12/1970 Jones....................................260/79.7

*Primary Examiner*—Joseph L. Schofer
*Assistant Examiner*—C. A. Henderson, Jr.
*Attorney*—Griswold and Burdick and D. B. Kellom

[57] ABSTRACT

Novel 2-methylene-3-butenyl quaternary ammonium monomers (I) and polymers (II):

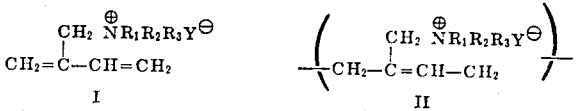

where $R_1$, $R_2$ and $R_3$ are organic groups, are prepared by reaction of 2-halomethyl-1,3-butadiene with a tertiary amine. The quaternary ammonium group increases the water solubility and hydrophilic properties of polymers containing II. Particularly useful are water-soluble quaternary ammonium polymers active as electroconductive additives for paper and other cellulosic products.

11 Claims, No Drawings

2-METHYLENE-3-BUTENYL QUATERNARY AMMONIUM MONOMERS AND POLYMERS

This application is a continuation in-part of application Ser. No. 798,512 filed October 23, 1968, now U.S. Pat. 3,544,532 which in turn is a division of application Ser. No. 381,546 filed July 9, 1964, now abandoned.

Mannich and Salzmann [Ber., 72, 506 (1939)] describe the synthesis of 1-dimethylamino-2-(dimethylaminomethyl)butanol-3 and a process for its conversion in low yield to the tertiary amine, 2-dimethylaminomethyl--1,3-butadiene. However, 2-methylene-3-butenyl quaternary ammonium monomers and polymers are not described in the prior art. Silvernail & Zembal U.S. Pat. No. 3,011,918 describes the use of vinylbenzyl quaternary ammonium polymers as an electroconductive additive for paper.

STATEMENT OF THE INVENTION

2-Methylene-3-butenyl quaternary ammonium monomers (I) and polymers containing a plurality of moieties of Formula II:

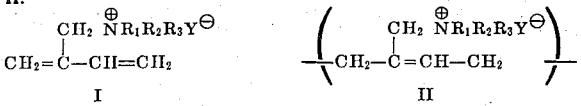

where $R_1$, $R_2$ and $R_3$ individually are $C_2$–$C_4$ mono- or dihydroxyalkyl groups, or $C_1$–$C_{18}$ alkyl, cycloalkyl, aryl, or aralkyl groups, and $Y^\ominus$ is the counteranion, are prepared by reaction of 2-chloromethyl or 2-bromomethyl-1,3-butadiene with a tertiary amine, $NR_1R_2R_3$ followed by polymerization. Alternately the 2-halomethyl-1,3-butadiene can be first polymerized followed by subsequent quaternization. Cationic copolymers are obtained by incorporating other copolymerizable ethylenically unsaturated monomers.

The presence of the methylene quaternary ammonium group increases the hydrophilic properties of the polymers. By appropriate choice of the substituents, $R_1$, $R_2$ and $R_3$, soluble polymers with varied chemical and physical properties desired for flocculants or dispersants can be obtained. The water-soluble cationic polymers are particularly useful as electro-conductive or wet-strength additives for paper and other cellulosic products. Also, the presence of residual unsaturation in the polymer provides ready sites for subsequent modification of the polymer. For example, the cationic polymer applied as a paper coating can be further polymerized or cross-linked to decrease the water sensitivity of the coating. The water-insoluble cross-linked resins are useful anion-exchangers.

GENERAL DESCRIPTION - QUATERNARY AMMONIUM MONOMERS (I)

The quaternary ammonium monomers (I) are conveniently prepared by reaction of 2-chloromethyl-1,3-butadiene with a tertiary amine. 2-Chloromethyl-1,3-butadiene (CMB) is prepared by chlorination of isoprene as described by Berenbaum U.S. Pat. No. 2,937,125 followed by fractional distillation to remove by-products including the isomeric cis- and trans-1-chloro-2-methyl-1,3-butadiene. Alternately, 2-bromomethyl-1,3-butadiene can be used.

For maximum water-solubility, tertiary $C_1$–$C_4$ alkyl and $C_2$–$C_4$ hydroxyalkyl amines are preferred. However, quaternary ammonium monomers have also been prepared from tertiary higher alkyl and aromatic amines. Typical tertiary amines include trimethylamine, tri-n--butylamine, dimethylaminoethanol, dimethylisopropanol-amine, dimethylbenzylamine, dimethylaniline, dimethylcyclohexylamine, N,N-dimethylamino-1,2-propanediol, methyldiethanolamine, and dimethyldodecylamine, as well as such tertiary heterocyclic amines as pyridine, 2,4-lutidine and N-methylmorpholine, etc. Mixtures of two or more amines can also be used.

In practice, amination is generally effectively and conveniently achieved by adding an aqueous solution of the desired tertiary amine to an alcoholic solution of 2-chloromethyl-1,3-butadiene. Alternately the reaction can be carried out in an anhydrous polar solvent such as methanol or a liquid solvent in which both the chloro-methylbutadiene and tertiary amine are soluble such as toluene or methylene chloride. Usually a 10 to 25 percent excess of amine is adequate to achieve high yields of the quaternary ammonium monomer with a reaction temperature between about 0° to 60° C. and preferably between 20° and 50° C. A reaction time of from a few minutes to several hours is generally adequate although a longer time may be required with less reactive amines.

When an aqueous solution of amine is employed, the soluble cationic monomer is usually dissolved in the aqueous phase. Often this aqueous solution can be directly used. However, when necessary, the cationic monomer can be isolated by removal of the solvent, by precipitation as an insoluble salt, or by other conventional means.

The quaternary ammonium monomers (I) prepared from 2-chloromethyl-1,3-butadiene have a chloride counteranion. If desired, the chloride anion can be replaced by standard ion exchange techniques with other common anions such as sulfate, bisulfate, nitrate, carbonate, acetate, citrate, etc. Normally, anions giving water-soluble alkali salts are preferred and the chloride salt is suitable for most purposes.

QUATERNARY AMMONIUM POLYMERS (II)

By virtue of the 1,3-diene structure, the quaternary ammonium monomers (I) are susceptible to polymerization alone or with other polymerizable ethylenically unsaturated monomers. The polymers range from viscous liquids to light colored solids depending on composition and molecular weight which can vary from low molecular weight oligomers containing less than about 10 monomer units to high polymers containing more than 100,000 depending primarily on polymerization conditions.

Homopolymers consisting essentially of repeating units II:

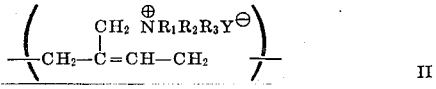

are particularly effective as electroconductive additives for paper. The 2-methylene-3-butenyl quaternary ammonium monomers can also be copolymerized with other ethylenically unsaturated monomers to give copolymers containing as an essential element a plurality of groups of Formula II. Such copolymers may also contain other substituent groups including hydroxyl, carboxyl, ester, amido, hydrocarbyl such as alkyl, aryl, alkaryl, aralkyl, cycloaliphatic; and halo-, hydroxy-, or amino-substituted hydrocarbyl groups.

The composition of copolymers can be varied widely. The amount of quaternary ammonium monomer required to modify the properties of a polymer is often small. For instance, about 0.5 mole percent of trimethyl-(2-methylene-3-butenyl)ammonium chloride copolymerized with a hydrophobic monomer such as styrene provides a copolymer having an appreciable increase in hydrophilic properties. Indeed, these cationic 1,3-butadiene monomers are particularly effectively employed in minor proportions ranging from about 0.5 to 20 mole percent based on total monomer to incorporate a moderate number of functional cationic groups in a copolymer.

Typical ethylenically unsaturated comonomers include: (a) vinyl aromatic compounds, such as styrene halo-substituted styrenes, e.g., 4-chlorostyrenes, 2,4-dichlorostyrene, alkyl-substituted styrenes, e.g., methylstyrene and 4-t-butylstyrene, divinylbenzene, and other vinyl aromatic monomers having typically from eight to about 12 carbon atoms; (b) acrylic acids, esters, amides, and salts such as acrylic acid, methacrylic acid, acrylamide, methacrylamide, alkyl acrylates (e.g., methyl, ethyl, propyl, butyl and dodecyl acrylate and methacrylate), sulfoethyl methacrylate, alkali metal acrylates and methacrylates (e.g., sodium or potassium acrylate and methacrylate), and the like; and (c) polymerizable alkenes and haloalkenes such as 1,4-butadiene, isoprene, 2-hydroxymethyl-1,3-butadiene; chloroprene, 2-chloromethyl-1,3--butadiene, vinylidene chloride, and vinyl ketones; and the like. Other monomers containing one or more ethylenic linkages capable of addition polymerization as well as combinations of two or more monomers may be used if desired.

The resulting copolymers contain functional quaternary ammonium groups plus other substituent groups of the comonomers. The molecular weight of these polymers range from a few hundred to a million or more, but typically lie between about 1,000 and about 500,000 depending upon the specific monomer and polymerization conditions.

The water-soluble copolymers are useful as flocculants and as electroconductive and antistatic additives. Water-insoluble copolymers are useful anion-exchange resins. In addition, the copolymers, like the homopolymers can be cross-linked by reaction of the hydroxyl groups with a cross-linking agent such as diglycidyl ether of bisphenol A, or toluene diisocyanate; and the like.

POLYMERIZATION PROCESS

The 2-methylene-3-butenyl quaternary ammonium monomers (I) are readily polymerized in bulk, in solution or in dispersion using conventional techniques. In some instances a solvent, such as water, methanol, or t-butyl alcohol, is preferred to insure more complete mixing of the monomers. Emulsion polymerization is also suitable for some systems.

Polymerization is accelerated by the addition of a vinyl polymerization catalyst such as sodium persulfate, hydrogen peroxide, benzoyl peroxide, tertiary butyl peroxide, $\alpha,\alpha'$-azobisisobutyronitrile, isopropyl peroxydicarbonate, diisobutyroyl peroxide, and redox systems such as persulfate-metabisulfite. Usually such catalysts are employed in an amount ranging from about 0.1 to 2 weight percent based on total monomer.

With a suitable catalyst, polymerization is readily achieved at temperatures ranging from about 0° to 200° C., preferably about 20°–60° C. The reaction pressure generally is not critical. However, oxygen is excluded to prevent discoloration of the polymer and chain termination.

The polymers are normally obtained in halide salt form, e.g. II, Y = Cl. However, other anions can be substituted if desired by standard techniques.

ALTERNATIVE POLYMER SYNTHESIS

An alternate and complementary approach to the synthesis of the quaternary ammonium polymers containing moieties of Formula II entails an initial polymerization or copolymerization of 2-chloromethyl-1,3-butadiene and subsequent reaction of the chloromethyl groups with a tertiary amine, $NR_1R_2R_3$. A cross-linking amount of a non-tertiary amine, such as dimethylamine, may be included in the polymerization processes above.

The prerequisite intermediate polymer can be prepared from 2-chloromethyl-1,3-butadiene by homopolymerization or copolymerization with an ethylenically unsaturated monomer as described above. While the amount of 2-chloromethyl-1,3-butadiene in the comonomer mixture can be as low as 0.5 mole percent, this approach to the synthesis of cationic polymers is most advantageous when 10–20 mole percent or more of 2-chloromethyl-1,3-butadiene is used. To obtain maximum cationic capacity, a homopolymer of 2-chloromethyl-1,3-butadiene is used.

Polymerization of 2-chloromethyl-1,3-butadiene is achieved by conventional means, preferably in aqueous emulsion. It is accelerated by heat and catalyzed by conventional free radical catalysts such as $\alpha,\alpha$-azobis-isobutyronitrile, potassium persulfate, benzoyl peroxide, and hydrogen peroxide. While optimum polymerization conditions will depend on the particular monomer and catalyst system being used, it is generally beneficial to carry out the polymerization between about 50° and 100° C. with a reaction time of from 2 to 50 hours or more to achieve high conversions. Cationic polymerization with catalysts such as boron trifluoride also can be used.

The resulting polymer can be isolated and purified by standard methods. For example, the homopolymer can be precipitated from aqueous emulsion with methanol. The essentially linear polymer is insoluble in water, methanol, and similar polar solvents but easily dissolves in such non-polar solvents as methylene chloride, carbon tetrachloride and toluene. Structural studies indicate that the homopolymer is largely a 1,4-addition polymer i.e., that the predominate structural moiety has the formula:

$$\left[-CH_2-\underset{\underset{CH_2Cl}{|}}{C}=CH-CH_2-\right] \qquad III$$

However, there is some evidence for minor amounts of 1,2-addition polymerization. As estimated from osmotic pressure measurements, the homo- and copolymer molecular weight can range from about 10,000 to 100,000.

The 2-aminomethyl polymers are then obtained by amination of the 2-chloromethyl-1,3-butadiene polymer with a tertiary amine as described above. A 10–25 percent excess of amine based on the chloromethyl content of the intermediate polymer is usually adequate for rapid and essentially complete amination at about 20°–60° C. With an aqueous amine, the quaternary ammonium polymer can generally be obtained as an aqueous solution which may be often used for many applications without further processing. When necessary, however, the cationic polymer can be isolated and purified by precipitation with an appropriate diluent, removal of the solvent, and other conventional means.

Within the general scope of this invention, optimum conditions for a particular monomeric or polymeric product can be determined in a routine manner. Also, by proper choice of reagents, mole ratios, and reaction conditions, it is possible to prepare products containing more than one type of functional group. For example, the properties of quaternary ammonium and sulfonium derivatives can be combined in the same product.

In summary, it has been discovered that new and useful quaternary ammonium polymers can be prepared from 2-chloromethyl-1,3-butadiene. The water-soluble cationic polymers are useful as flocculants in aqueous mineral and sewage systems and as additives to increase the strength or electroconductivity of paper, while water-insoluble polymers are particularly useful in removing anions from aqueous process streams by ion-exchange.

To illustrate further the present invention, the following examples are given. Unless otherwise specified, all parts and percentages are by weight.

EXAMPLE 1: QUATERNARY AMMONIUM MONOMERS-I

2-Chloromethyl-1,3-butadiene was obtained by fractional distillation of chlorinated isoprene. A mixture, b.p. 76–78° C/300 mm., contained by vapor phase chromatographic analysis 80 percent 2-chloromethyl-1,3-butadiene with 20 percent cis- and trans-1-chloro-2-methyl-1,3-butadiene and isoprene hydrochlorides. By further fractionation, 2-chloro-1,3-butadiene with a minimum purity of about 95 percent was obtained.

A. To a solution of 29.5 parts (0.29 mole) of 96.7 percent 2-chloro-1,3-butadiene in 80 parts of absolute ethanol was added at room temperature 70 parts (1.2 moles) of trimethylamine in 160 parts of ethanol. After reacting for 2 hours at room temperature, the solvent and excess amine were stripped from the product in vacuo to give 37.3 parts (80 percent yield) of a hydroscopic white crystalline solid which readily dissolved in water.

The infrared spectrum and elemental analysis of the product were consistent with the structure:

i.e., trimethyl (2-methylene-3-butenyl) ammonium chloride. The ultraviolet spectrum of a dilute aqueous alcohol solution showed a peak at 220 mµ characteristic of a 1,3-diene with an extinction coefficient of about 28,000 cm.²/mole. From analysis of the nuclear magnetic resonance (NMR) spectrum in D₂O solution, the monomer contained less than 5 percent dimer.

B. To a solution of 10 parts (0.10 mole) of 87 percent 2-chloromethyl-1,3-butadiene in 40 parts of absolute ethanol was added 15.7 parts (0.10 mole) of octyldimethylamine in 70 parts of ethanol. The mixture was shaken for 6 hours at 25° C. and then concentrated in vacuo. The NMR spectrum and ionic chloride content of the resulting hydroscopic residue are consistent with the presence of octyldimethyl (2-methylene-3-butenyl) ammonium chloride. (I: $R_1, R_2 = CH_3; R_3 = C_8H_{17}$).

C. In a similar manner quaternary ammonium monomers were prepared by reaction of 2-chloromethyl-1,3--butadiene with benzyldimethylamine and with N-methyl-morpholine.

EXAMPLE 2: QUATERNARY AMMONIUM POLYMERS-II

A. A mixture of 31.4 parts of the quaternary trimethylammonium monomer described in Example 1A, 7.5 parts of water, and 3 parts of a 5 percent solution of disodium ethylenediaminetetraacetate was adjusted to pH 5 and deaerated. Then 0.74 parts of a 10 percent aqueous solution of t-butylhydroperoxide was added and the mixture heated for 16 hours at C. The resulting trimethylammonium polymer (TMA-2A) had a viscosity of 1.30 cps. as a 5 percent solution in dilute (4 percent sodium chloride at pH 5 and 25° C. No monomer was evident in the NMR spectrum. As shown below this quaternary ammonium polymer is an effective electroconductive additive for paper.

B. Using a 50 percent aqueous solution of the trimethylammonium monomer and $K_2S_2O_8$ as a catalyst, a soluble cationic polymer was obtained having a 5 percent solution viscosity of 1.51 cps.

C. Concentrated solutions of the trimethyl-ammonium chloride monomer in water or alcohol also undergo spontaneous polymerization at or near room temperature. Thus, 2.0 parts of 2-methylene-3-butenyltrimethylammonium chloride in 1.03 parts of aqueous t-butyl alcohol (1/1 by volume) polymerized spontaneously when stored at about 5° C. for 4 days to yield a white, very rubbery, water-soluble polymer having a reduced specific viscosity in 2 percent NaCl of 2.34 dl/g. Another sample as a 75 percent aqueous solution polymerized overnight at room temperature to yield a polymer having a reduced specific viscosity of 0.6 dl/g in 2 percent NaCl. Radical sources active in this temperature range such as UV light with a photosensitizer, β- or γ-irradiation or a percarbonate catalyst are effective in giving high molecular weight water-soluble homopolymers exceeding the size which penetrates Sephadex resin used in gel phase chromatography.

D. A sample (26.8 parts) of crude 2-chloromethyl-1,3-butadiene containing about 50 percent 2-chloromethyl-1,3-butadiene, 20 percent trans-1-chloro-2-methyl-1,3-butadiene, and 12 percent cis-1-chloro-2-methyl-1,3-butadiene was shaken with 20 parts of dimethylethanolamine at room temperature. An exothermic reaction occurred. The viscous mixture was extracted with acetone and 32 parts of a water-soluble gummy residue obtained containing 6.3 percent N and 17.8 percent Cl. Partial fractionation was made by dissolving the product in water followed by precipitation with acetone to remove the residual monomer and by-product dimer.

EXAMPLE 3: POLY(2-CHLOROMETHYL-1,3-BUTADIENE)

A. An aqueous emulsion was prepared by vigorously agitating a mixture of 260 parts of 80 percent 2-chloromethyl-1,3-butadiene, 0.12 part of tert.-dodecylmercaptan, and an aqueous solution of 1.4 parts of sodium lauryl sulfate, 0.3 part of potassium persulfate and 0.3 part of sodium bicarbonate in 140 parts of water. Polymerization was achieved by heating the emulsion at about 50° C. for 40 hours. Then the polymer was precipitated by pouring the emulsion into an excess of methanol with vigorous agitation. The finely divided, white product was recovered by filtration, washed with methanol and then air dried.

The poly(2-chloromethyl-1,3-butadiene), P(CMB), was insoluble in water and methanol, but dissolved in methylene chloride, toluene and tetrahydrofuran. It contained 30.3 wt. percent side chain chlorine as determined by reaction with excess trimethylamine and 31.5 wt. percent total chlorine by elemental analysis. The higher total chlorine content indicates copolymerization of some 1-chloro-2-methyl-1,3-butadiene. The polymer had an average molecular weight of 35,000 as determined by the membrane osmotic pressure of a tetrahydrofuran solution. By gel phase chromatography in tetrahydrofuran, the P(CMB) has the same molecular size as a linear polystyrene having a molecular weight of about 50,000. Spectral studies indicate that the polymer has predominately the 1,4-addition structure.

B. A mixture of 25 parts 2-chloromethyl-1,3-butadiene, 50 parts water, 0.67 part 1.0 N HNO₃, 0.28 part Arquad 1250, (a n-alkyl trimethyl ammonium chloride surfactant from Armour Industrial Chemical Co.), 0.125 pt. dodecyl mercaptan, and 0.25 pt. azo-bis-isobutyronitrile was heated at 50° C. for 22 hours in a tumbling bath to give a clear rubbery gel and a latex. The latex was coagulated with methanol and the coagulum and gel dissolved in dioxane to give a solution containing 15.4% P (CMB) solids. The polymer molecular weight distribution ranged from about 10,000–6,000,000 by gel phase chromatography calibrated with polystyrene.

C. Cationic polymerization of 2-chloromethyl--1,3-butadiene containing cis- and trans-1-chloro-2-methyl--1,3-butadiene was carried out with boron trifluoride at −78° C. without a solvent. The resulting polymer was lower in average molecular weight than the free-radical polymer. Cationic polymerization of 2-chloromethyl-1,3--butadiene along at −50° C. with BF₃ gave a polymer with significant cross-linking.

D. Other polymers and copolymers containing polymerized 2-chloromethyl-1,3-butadiene are prepared in a similar manner. Copolymers of 2-chloromethyl-1,3--butadiene and 1,3-butadiene containing more than 25 mole percent of 2-chloromethyl-1,3-butadiene give water-soluble derivatives when quaternized. With a lower level of chloromethyl monomer or incomplete amination, polymers soluble in aqueous alcohol or acetone are obtained.

EXAMPLE 4: QUATERNARY AMMONIUM POLYMERS FROM P(CMB)

A. To about 250 parts of an isolated poly(2-chloromethyl-1,3-butadiene) containing 30.3 wt. percent side chain chlorine was added 720 parts of 25 wt. percent aqueous trimethylamine (30 percent excess) and the mixture are agitated at room temperature until the polymer completely dissolved. The resulting quaternary ammonium derivative was precipitated by pouring the aqueous solution into an excess of acetone with vigorous stirring. A sample of the hydroscopic cationic polymer, purified by reprecipitation from aqueous solution contained 19.2 wt. percent ionic chloride indicating a purity of about 90 percent as the quaternary trimethylammonium derivative, (TMA–4A).

B. In a similar manner, other quaternary ammonium polymers are prepared by reaction of 2-chloromethyl-1,3-butadiene polymers with other tertiary amines such as dimethyl-dodecylamine and dimethylaminoethanol, pyridine using sufficient excess amine to minimize cross-linking. The dimethyl-dodecylamine derivative was insoluble in water, but soluble in methanol, isopropanol, and 50 percent aqueous isopropanol.

C. A portion of the P(CMB) described in Example 3B was aminated with excess aqueous trimethylamine. Precipitation with acetone gave a crisp tan solid having a reduced specific viscosity of 3.47 dl/g measured at 1 percent concentration in 1% NaCl.

D. To 37.6 parts of the P(CMB) dioxane solution of Example 3B was added 11 parts of dimethylaminoethanolamine. Within an hour the solution had gelled. The gelled product was dissolved in water and then dried to yield 7 parts of a tan solid having a reduced specific viscosity of 7.38 dl/g (1 percent in 1% NaCl), and containing 6.49% N (theory 7.3 percent).

E. In another run, the P(CMB) dioxane solution was added to dimethylethanolamine at 50° C. The gelatinous polymer was dissolved in water and precipitated with acetone. The resulting solid polymer contained 7.2% N and 16.2% Cl.

F. The copolymers of 2-chloromethyl-1,3-butadiene and 1-chloro-2-methyl-1,3-butadienes of Example 3C were aminated with aqueous trimethylamine, but amination occurred only to the extent of the amount of 2-chloromethyl-1,3-butadiene in the copolymers.

EXAMPLE 5: ELECTROCONDUCTIVE ADDITIVES

The quaternary ammonium polymers described in Examples 2 and 4 are effective electroconductive additives for paper. In tests made according to the general method described in ASTM D-257-61, standard test sheets of 51 lb. bleached sulfite paper were dipped in an aqueous solution of the quaternary ammonium polymers until a 5–15 weight percent polymer pickup was obtained. The treated sheets were dried for 5 minutes at about 110° C. weighed, and cut into standard test strips. The strips were conditioned at room temperature and the desired relative humidity (70 RH) for 24 hours. Then the electroconductivity was measured using strips treated with a commercial quaternary ammonium electroconductive resin as a control standard.

A. Typical results given in Table 1 compare the effectiveness of the polymerized trimethyl(2-methylene-3-butenyl) ammonium chloride (TMA-2A) and the trimethyl-amine derivative of poly(2-chloromethyl-1,3-butadiene) (TMA-4A) with the commercial additive in both surface and volume resistivity.

TABLE 1

Electroconductive Additives

A. Surface Resistivity

| Additive | Wt.% | Surface Resistivity, ohms | | |
|---|---|---|---|---|
| | | 7–10%RH | 30–33%RH | 56–60%RH |
| Commercial | 7.0 | $2.6 \times 10^9$ | $3.5 \times 10^8$ | $1.8 \times 10^7$ |
| TMA-2A | 10.0 | $4.4 \times 10^{11}$ | $2.8 \times 10^8$ | $1.1 \times 10^7$ |
| TMA-4A | 8.0 | — | $3.4 \times 10^{10}$ | — |

B. Volume Resistivity

| Additive | Wt.% | Volume Resistivity, ohms | | |
|---|---|---|---|---|
| | | 7%RH | 30–33%RH | 60%RH |
| Commercial | 7.0 | $1.2 \times 10^{13}$ | $8.1 \times 10^{11}$ | $5.7 \times 10^9$ |
| TMA-2A | 8.2 | $1.9 \times 10^{13}$ | $4.0 \times 10^{11}$ | $2.9 \times 10^9$ |
| TMA-4A | 16 | — | $4.8 \times 10^9$ | $1.8 \times 10^7$ |

B. Another similar data with other trimethylammonium (TMA) and dimethylethanolammonium (DMEA) polymers are given in Table 2.

TABLE 2

Electroconductive Additives

| Test | Additive | Wt.% | S.E.R.[a] | V.E.R.[b] |
|---|---|---|---|---|
| 2A-1 | Control[c] | 4.42% | — | $6.23 \times 10^{11}$ |
| 2A-2 | TMA-2D | 3.89% | — | $1.33 \times 10^{11}$ |
| 2B-1 | Control | 4.15% | $1.15 \times 10^8$ | $2.63 \times 10^{11}$ |
| 2B-2 | TMA-4C | 3.67% | $2.44 \times 10^{10}$ | $1.19 \times 10^{11}$ |
| 2B-3 | DMEA-4D | 2.61% | $1.00 \times 10^{10}$ | $2.83 \times 10^{11}$ |
| 2B-4 | DMEA-4 D | 4.65% | $4.34 \times 10^9$ | $2.28 \times 10^{11}$ |

[a] Surface electrical resistivity, ohms
[b] Volume electrical resistivity, ohm-cm
[c] Commercial quaternary ammonium electroconductive resin EXAMPLE 6: Flocculants The water-soluble ammonium polymers are active as flocculants for a variety of aqueous slurries. Typical data from tests with the quaternary trimethylammonium polymer (TMA-4A) described in Example 4A are given in Table 3. In these tests a known amount of dilute aqueous polymer solution was added to a well dispersed aqueous suspension of finely divided mineral ore in a graduated cylindrical tube. The settling rates of the treated slurries were determined in the usual manner. At the end of the sedimentation period, the clarity of the supernatant liquid was measured with an optical turbidimeter calibrated with standard silicon dioxide suspensions. The clarity of the overhead supernatant liquid was recorded in terms of an equivalent silicon dioxide content (ppm $SiO_2$).

TABLE 3

Flocculation Tests

Trimethylamine Derivative of Poly(2-chloromethyl-1,3-butadiene)—TMA-4A

| Slurry | Polymer Added | Settling Rate | Overhead Clarity |
|---|---|---|---|
| Quebec Cartier Taconite, 0.9% Solids | 1 ppm. | 7.58 in/min. | 180 ppm. $SiO_2$ |
| | 2 ppm. | 9.69 in/min. | 75 ppm. $SiO_2$ |
| | 3 ppm. | 8.72 in/min. | 41 ppm. $SiO_2$ |
| Erie Mining Taconite Tailings, 13% Solids | None | 0.304 in/min. | 928 ppm. $SiO_2$ |
| | 1.5 ppm. | 0.680 in/min. | 992 ppm. $SiO_2$ |
| | 2.5 ppm. | 0.881 in/min. | 640 ppm. $SiO_2$ |
| | 3.5 ppm. | 0.958 in/min. | 368 ppm. $SiO_2$ |
| Arcturus Tailings, 6% Solids | 2.5 ppm. | 0.88 in/min. | 176 ppm. $SiO_2$ |
| | 5.0 ppm. | 1.70 in/min. | 96 ppm. $SiO_2$ |
| | 10.0 ppm. | 2.98 in/min. | 39 ppm. $SiO_2$ |

WE CLAIM:

1. A water-soluble quaternary ammonium polymer having at least 0.5 mole percent of polymerized moieties of Formula II:

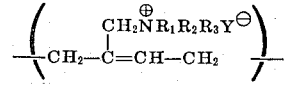

where $R_1$, $R_2$ and $R_3$ individually are $C_2$–$C_4$ mono- or dihydroxyalkyl groups, or $C_1$–$C_{16}$ alkyl, cycloalkyl, aryl, or aralkyl groups; and Y is a water-soluble anion; said polymer being
1. A homopolymer of the quaternary ammonium monomer I:

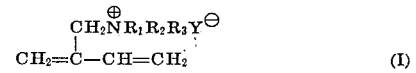

2. A copolymer of the quaternary ammonium monomer I and an ethylenically unsaturated comonomer polymerizable therewith, 3. A quaternized homopolymer of 2-chloromethyl-1,3-butadiene or 4. A quaternized copolymer of 2-chloromethyl-1,3-butadiene and an ethylenically unsaturated comonomer polymerizable therewith.

2. The polymer of claim 1 where $R_1$ and $R_2$ individually are $C_1$–$C_4$ alkyl or $C_2$–$C_4$ hydroxyalkyl, $R_3$ is $C_1$–$C_{16}$ alkyl and Y is a water-soluble anion.

3. The polymer of claim 1 where $R_1$, $R_2$ and $R_3$ are methyl, and $Y^\ominus$ is chloride.

4. The polymer of claim 1 where $R_1$ and $R_2$ are methyl, $R_3$ is hydroxyethyl, and $Y^\ominus$ is chloride.

5. The polymer of claim 1 obtained by homopolymerization of trimethyl-2-methylene-3-butenyl ammonium chloride.

6. The polymer of claim 1 obtained by homopolymerization of dimethylhydroxyethyl-2-methylene-3-butenyl ammonium chloride.

7. The polymer of claim 1 consisting essentially of a copolymer of:
A. A 2-methylene-3-butenyl quaternary ammonium compound of Formula I:

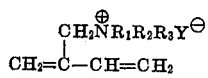

where
$R_1$ and $R_2$ individually are $C_1$–$C_4$ alkyl or $C_2$–$C_4$ hydroxyalkyl,
$R_3$ is $C_1$–$C_{16}$ alkyl, and
$Y^\ominus$ is a water-soluble anion; and
B. An ethylenically unsaturated comonomer selected from the group consisting of (1) vinyl aromatics, (2) acrylic acids, amides, esters, and salts, and (3) alkenes and haloalkenes.

8. The polymer of claim 1 where the comonomer is 1-chloro-2-methyl-1,3-butadiene.

9. The polymer of claim 8 where $R_1$ and $R_2$ are methyl, and $R_3$ is hydroxyethyl.

10. The water-soluble polymer of claim 1 obtained by quaternizing a polymer consisting of at least 20 mole percent polymerized 2-chloromethyl-1,3-butadiene.

11. The water-soluble polymer of claim 10 wherein the quaternized polymer is a copolymer of 2-chloro-methyl-1,3-butadiene and 1,3-butadiene.

* * * * *

UNITED STATES PATENT OFFICE
CERTIFICATE OF CORRECTION

Patent No. 3,673,164  Dated 27 June 1972

Inventor(s) Giffin D. Jones, Gerald R. Geyer and Melvin J. Hatch

It is certified that error appears in the above-identified patent and that said Letters Patent are hereby corrected as shown below:

Column 5, line 28, insert --60°-- between "at" and "C".

Signed and sealed this 6th day of February 1973.

(SEAL)
Attest:

EDWARD M. FLETCHER, JR.
Attesting Officer

ROBERT GOTTSCHALK
Commissioner of Patents